United States Patent Office 3,054,311
Patented Sept. 18, 1962

3,054,311
AUTOMATIC CONTROL SYSTEM FOR ROLLING MILLS AND ADJUSTABLE DIES WITH AUTOMATIC ERROR DETECTION
James B. Murtland, Jr., Tarentum, Pa., assignor to Allegheny Ludlum Steel Corporation, Pittsburgh, Pa., a corporation of Pennsylvania
Filed Apr. 17, 1959, Ser. No. 807,248
9 Claims. (Cl. 80—56)

My invention relates broadly to the production of material by rolling through single or multiple stand rolling mills or by drawing through single or multiple dies of the kind having opposing die surfaces whose separation is adjustable and more particularly to an automatic system for controlling such mills or dies so as to produce material of a predetermined desired uniform gage thickness and to automatically check the produced material gage and adjust the system to insure production of material of desired uniform gage.

One of the objects of my invention is to provide an automatic control system for rolling mills or systems employing adjustable dies which measures material input gage and controls the mill or dies at the bite of the mill and then measures the output gage of the material and compares it to the selected desired output gage to obtain an error signal for more precise control of the automatic control system.

Another object of my invention is to provide a control system for rolling mills which automatically provides error detection and compensation of the control system on the partial or complete failure of various components in said control system.

Still another object of my invention is to provide an automatic control system for rolling mills which operates with more precise control by compensating for variation in material hardness, material width variations, pick-up head variations, mill variations and other such variables by measuring and comparing material output gage with the selected desired output gage.

A further object of my invention is to provide an automatic control system for rolling mills which makes it much easier and more simple to approach the optimum value of desired material output gage.

Figure 1:
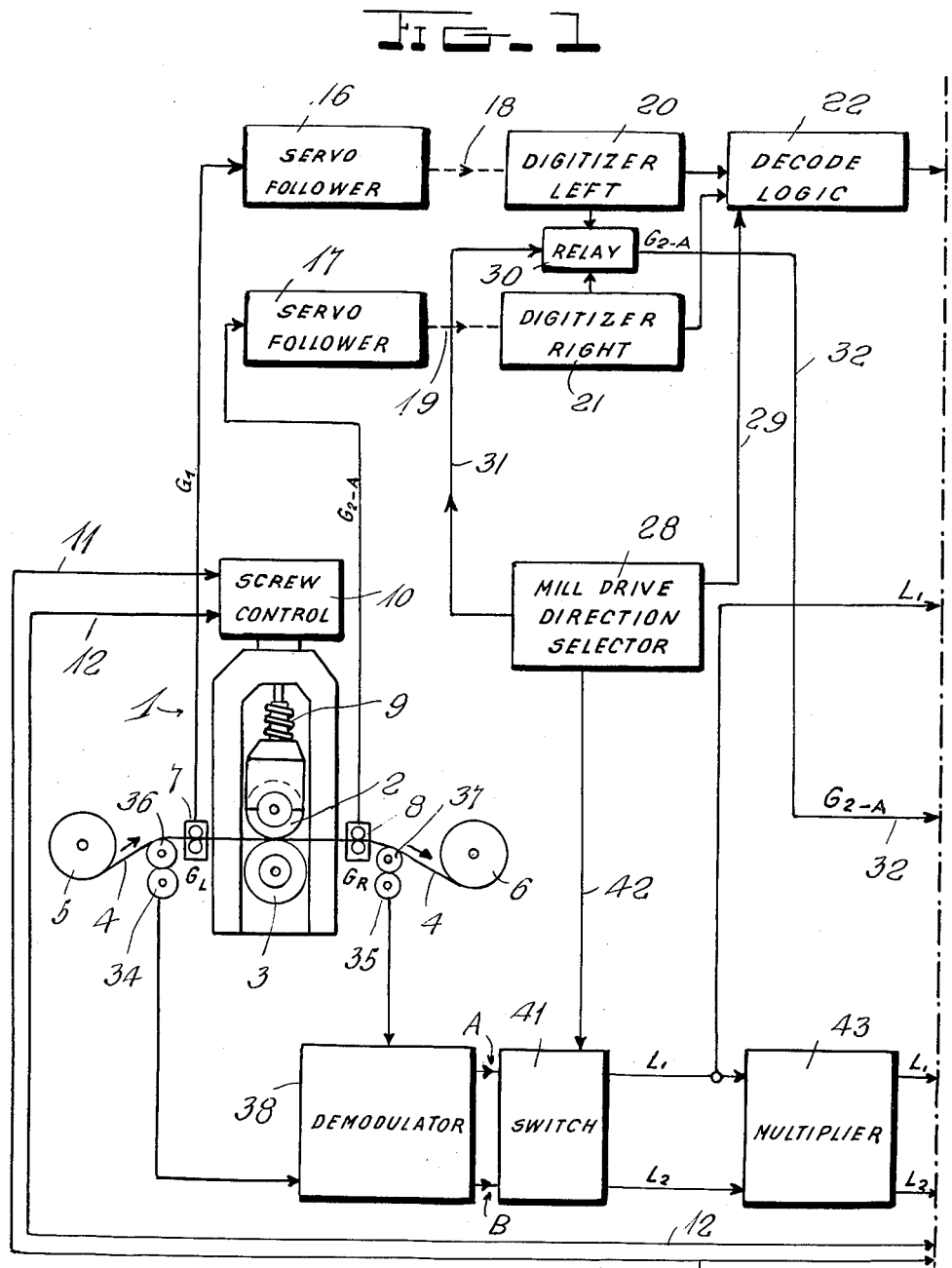
Figure 2:
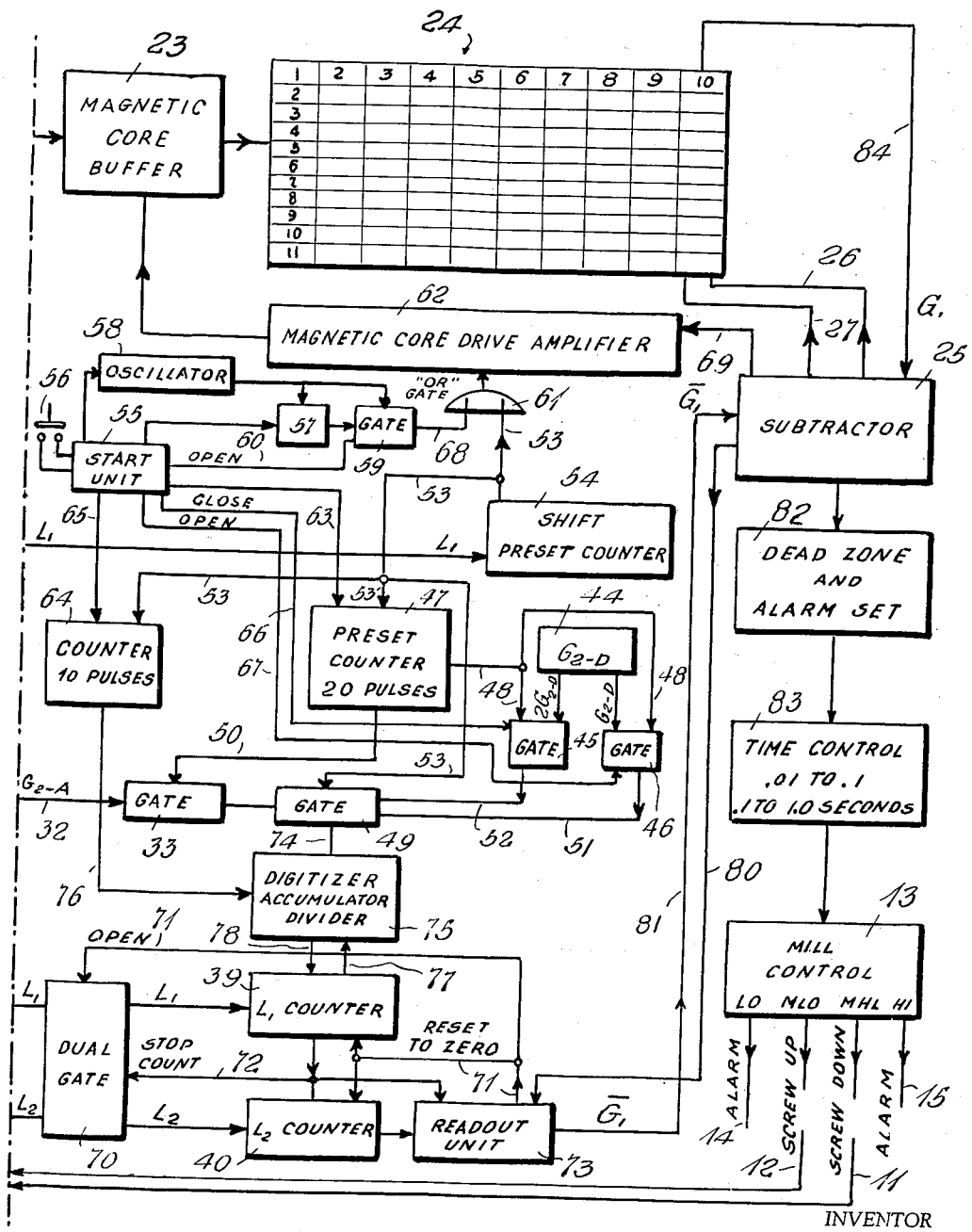

Other and further objects of my invention reside in the application of my gage error detection system of the automatic control system to bidirectional rolling mills and also in the methods by which the gage error signals are derived through a comparison process as set forth more fully in the specification herein after following by reference to the accompanying drawings in which:

FIGS. 1 and 2 form a composite schematic diagram when the right edge of FIG. 1 is disposed adjacent the left edge of FIG. 2, the composite diagram showing in block form the control system for solving and executing the teachings of my invention.

My invention involves the modification of the character of material based on the constant volume principle and is directed to the controlled production of material by rolling through single or multiple stand rolling mills or by drawing through single or multiple dies of the kind having opposing die surfaces whose separation is adjustable. More accurate dimensional control is an objective of automatic controls for the aforementioned equipment. For simplicity of description, this disclosure will concern itself with the description as applied to single stand rolling mills. Those skilled in the art can obviously see the correlation of the hereafter described systems to other rolling or drawing operations.

In the automatic control system of my invention I have utilized many of the components and their arrangement from my joint application, Serial No. 761,818, filed September 18, 1958, now Patent No. 3,015,974 entitled "Automatic Control System for Rolling Mills and Adjustable Dies," with Orville E. Orbom and Fred J. Schoepf.

In the majority of existing control systems for mills or dies, the system is controlled from a gage measurement taken several feet beyond the exit side of the rolling mill, by an elongation or percent reduction measurement, or by a roll pressure measurment. In a system employing gage measurment, the material, after reduction, progresses to the gage, which may be several feet beyond the bit of the mill, before any error present in material thickness can be detected. This distance from the bite of the rolls to the gage is commonly referred to as "Transport Distance." The time required for the material to reach the exit gage is denoted as "Transport Time." Time required to measure the strip gage is referred to as "Sensing Time." Transport time and sensing time are major elements in developing error commands. Transport distances of five (5) feet or more are common in most of the commercial rolling equipment available at present. A system having a transport distance of five (5) feet would not be capable of detecting an error signal until five (5) or more feet of material had passed from the bite of the mill rolls. The corrective signal would then be transmitted to the mill screwdown; but, the measuring gage would not detect the result of this action until five (5) or more feet of material had passed through the mill. From this discussion, it is seen that a system of this sort has a natural frequency of oscillation. If this oscillation were left to exist without any attempt to control it, the results would be undesirable. For a material entering the mill with fairly noticeable changes in gage, the system described would cause such wide variations in output gage that in most probability would eventually result in tearing of the strip. In an attempt to control the natural frequency of oscillation, some designers have damped their system so as to allow only a certain portion of the requested corrective signal after each measurement to be transmitted to the screws. Other designers have provided damping in the screws in order to slow down the response to any corrective signals. In any case, damping considerably reduces the efficiency and effectiveness of these control systems. In a highly damped system, the result is a number of ensuing measurements before the material is brought within gage limits resulting in the waste of material which has progressed from the mill before the desired gage could be attained. In present day commercial mills, this loss is considerable.

A system employing elongation measurements as a means of control has one basic advantage; the transport distance of such a system is zero if the strip is under tension. Two basic types of measuring systems may be employed, an instantaneous rate measuring device such as a D.C. tachometer as described in other patents or a sampling type of device as described in Orville E. Orbom's copending patent application "Elongation Control System," Serial No. 680,349, filed August 26, 1957. The strip length-measuring devices may be placed at any distance from the roll bite of the mill. In the sampling type system, for a certain increment of length passing through the entering length-measuring device, there will be an equal or greater increment of length measured at the exit device. The exit length is dependent on reduction. Since the transport time (with the strip in tension) is zero, the only time delay in the system will be the time involved in sensing sample lengths at the entrance and exit of the mill. These increments can be made so short as to be ignored. Although it would appear that an elongation type of system control would be desirable, further analysis shows a serious shortcoming of this system. An elongation system will only reduce the material a given percentage. This system does not control to a given gage unless the entering strip gage is constant. Since the gage of the entering strip gage varies, this type of control is an inaccurate means of gage control. To illustrate, let us assume that an increment of material .040 inch thick enters a mill followed by an increment .080 inch thick. It is further supposed that the opening between the mill rolls is such as to reduce the first increment to a thickness or gage of .020 inch. In doing so, the material must then have been elongated to twice its original length. When the second increment of material (.080 inch thick) enters the mill, it will also be reduced to a gage of .020 inch. However, the elongation in this case is four times the original length; therefore corrective mill action will be requested by the system in the second case. But, corrective mill action is not desired since the exit gage or thickness is in both cases alike. Thus, it can be seen that a system employing elongation measuring methods alone is not feasible for gage control.

Systems utilizing roll pressure measurements as a means of control leave much to be desired when precision control of strip gage is required. First, an inherent factor in a pressure measuring system is the natural spring of the mill housing. There is no reasonable means of keeping the mill housing rigid under the extreme forces encountered in rolling. Compensating for this housing spring is possible; however, a second disadvantage would still exist in a roll pressure measuring system. This appears as a result of differences in material hardness at different points in a strip. Hard materials wil not be reduced as much as soft materials under certain roll pressure conditions.

In my joint application with Orville E. Orbom and Fred J. Schoepf for "Automatic Control System For Rolling Mills and Adjustable Dies," previously mentioned, we described a control system based on an entirely new basic concept of mill control, applied in such a manner that the transport time is zero and the measuring time is essentially zero. One of the greatest advantages of that control system is that it measures and controls a rolling mill at the bite of the mill. Basically, the system is designed on the concept that the volume of material coming out of the mill must be equal to the volume entering the mill. Thus:

$$V_1 = V_2$$

and (1) $$L_1 W_1 G_1 = L_2 W_2 G_2$$

where:

$L_1$ = length of material entering mill
$L_2$ = length of material leaving mill
$G_1$ = gage of material entering mill
$G_2$ = gage of material leaving mill
$W_1$ = width of material entering mill
$W_2$ = width of material leaving mill If $X$ = the error control signal: We can see that $$X = \pm L_1 W_1 G_1 \mp L_2 W_2 G_2$$

The broad concept of that invention is any system or combination of systems viz., hydraulic, pneumatic, electrical, mechanical, etc. that will perform the necessary measuring and computations of the above formula so as to measure, compute, and/or control any material output from any single or multiple stand rolling mill, or measure, compute and/or control any material output from any drawing through single or multiple dies of the kind having adjustable opposing die surfaces.

In those cases where the lengths, widths, or thicknesses may remain constant, this formula may be simplified into several simplified versions.

In cold rolling, width of strip usually remains constant even though the material is being passed through the mill. Some materials to be rolled will be encountered wherein the exit width will not equal the entering width because of rolling forces. If it is found that there is no difference in exit and entering widths, then $W_1 = W_2$ and Formula 1 can be simplified to:

(2) $$L_1 G_1 = L_2 G_2$$

$$X = \pm L_1 G_1 \mp L_2 G_2$$

For the case where the exit width differs from the entering width by a known constant amount, my previously mentioned joint application teaches that a constant correction can be applied to any system designed on the basis of Equation 2 to compensate for this difference in widths. In systems where the width is continually varying, width measuring devices can also be added to reflect the variation to equation solving equipment. In claiming a system capable of measuring and controlling at the bite of the mill and eliminating transport distance, it was our intention, in my previously mentioned joint application, to apply the above equation in a manner wherein the input gage ($G_1$) was calculated on the basis of the other two or three variables ($L_1$, $L_2$, and $G_2$), then compared against the actual measured value of $G_1$. Equation-wise, this may be written:

$$\overline{G}_1 = \frac{L_2}{L_1} G_2$$

where $\overline{G}_1$ represents calculated input gage $$X = G_1 - \overline{G}_1 = G_1 - \frac{L_2}{L_1} G_{2-D}$$

where:

$G_1$ represents measured input gage
$G_{2-D}$ represents desired exit gage.

As discussed previously in the description of the elongation type of control system, transport time is zero, and the incremental sampling length could be made so short as to allow the elongation or length sensing time to be ignored. This feature is an integral part of the system of my invention set forth in my previously mentioned joint application, due to the elongation or length measuring means ($L_1$, $L_2$) which we employed. In addition, the desired exit gage ($G_{2-D}$) was used in the calculation of desirable input gage, rather than actual output gage ($G_2$); thus, the control system of the application was capable of control "before the fact" rather than "after the fact." In other words, the system would not have to wait until the material had progressed beyond the bite of the mill before recognizing and deciding on the necessary control operation. Thus, that system anticipated and recognized the necessary mill screw action as the material approached the mill. The automatic control system set forth in my previously mentioned joint application, entitled "Automatic Control System For Rolling Mills and Adjustable Dies" has its shortcomings, since it made no attempt to check whether the mill output material was actually conforming to the desired output gage expressed by the mill operator in the desired $G_2$ push-button selector. Thus it is the purpose of my invention in this specification to descirbe a method of providing the automatic control system of my previous joint disclosure in my pending application with Orville E. Orbom and Fred J. Schoepf, Serial No. 761,818, filed September 18, 1958, for "Automatic Control System for Rolling Mills and Adjustable Dies," with automatic error detection, as well as more precise control means. In that joint application, original thoughts entering into the design of the automatic control system were based on the proof of the theory that material output gage could be measured and controlled while the material was in the bite of the mill, as previously set forth. This theory was proven to be a fact under actual operating conditions. However, that fact only holds true as long as all components of that automatic control system function properly. If some component partially or completedly fails, the control system of my previous joint application tries to maintain the desired output gage, but may not do so. For instance, should the $L_2$ counter fail, it may reflect readings which are in error, and the system will control in accordance with these erroneous readings; in the meantime, output material gage may have radically departed from the desired gage. The automatic control system of my previously mentioned joint application would thus be dependent on the rolling mill operator to detect these failures or departures.

The controls described in this disclosure provide error detection and compensation by an arrangement wherein the material output gage $G_2$ is actually measured ($G_{2-A}$) and then compared to the selected desired output gage ($G_{2-D}$). This arrangement also results in more precise control, since factors, such as variations in material hardness, material width variations, pick-up head variations, mill variations, etc., are reflected in the comparison. Thus it is much easier to approach the optimum value of material output gage.

In this mode of control, many of the components used in my previous joint invention of "Automatic Control System For Rolling Mills and Adjustable Dies," will not be necessary in the system of my invention disclosed in this application. These unnecessary components are the "K Factor" unit, the "Width Factor" unit, the "WK−1" unit and the "$G_2WK$" unit, and associated circuits. It is possible to remove these units since these variations will be reflected in the measured output gage, and thus will be compensated for. The desired output gage unit, with some modifications, is still utilized as shown in the attached drawings.

Mathematically, this automatic error control addition to my previously mentioned joint invention can be substantiated and proven by referring to our basic design equation described on pages 19 and 26 of the patent application Serial No. 761,818 for "Automatic Control System for Rolling Mills and Adjustable Dies." Therein we said:

$$\overline{G}_1 = \frac{L_2 G_2 K W}{L_1}$$

where:

$\overline{G}_1 =$ calculated input gage
$L_2 =$ output strip length
$L_1 =$ input strip length
$G_2 =$ present desired output gage ($G_{2-D}$)
$W =$ width factor
$K =$ pick-up factor
$G_1 =$ measured input gage.

In that automatic control system we arranged our control mechanism in a manner such that $L_1$ would be a direct reflection of $G_2KW$, and therefore the basic equation then became:

$$\overline{G}_1 = \frac{L_2 G_2 K W}{G_2 K W} = L_2$$

The control means described in this application relieves the necessity of the factors W and K, therefore allowing a simpler solution to the equation; since we can then arrange the equipment in a manner whereby $L_1$, equation-wise can be replaced by $G_2$. This may be written as follows:

Since $$\overline{G}_1 = \frac{L_2 G_2}{L_1}$$

and $\qquad L_1 = G_2$ then $$\overline{G}_1 = \frac{L_2 G_2}{G_2} = L_2$$

Referring to the drawings in more detail, reference character 1 schematically designates a conventional rolling mill having coacting pressure rolls 2 and 3 through which the material 4 being engaged passes from the coiled roll 5 to the coiled roll 6. For the purposes of this discussion we will consider that the material being rolled is passing from coiled roll 5 to coiled roll 6. Thus we find that the left-hand gage ($G_L$) designated at 7 refers to the material thickness gage on the input side of this rolling mill and right-hand gage ($G_R$) designated at 8 refers to the material thickness gage on the exit side of the rolling mill.

The mill rolls 2 and 3 are controlled by various means which, in this instance, has been indicated as a screw 9 operated by screw control 10 which is operated through leads 11 and 12 from the mill control designated at 13. The mill control 13 has been shown as including the screw-up circuit 12 and the screw-down circuit 11 and separate alarm control circuits designated at 14 and 15. The alarm circuits include provisions for locking out automatic control of the mill screws and returning the mill to manual control.

When the material is traversing the mill in one direction input measurements are effected by one gage, while output measurements are effected by the opposite gage, whereby when the mill is reversing and operates in the opposite direction the input and output measurements are effected by the respective opposite gages. The gage measurements $G_1$ and $G_{2-A}$ (actual output gage) in each case, which are used for purposes of control of the mill, are the gage measurements on the entry side of and on the exit side of the mill, respectively, regardless of mill direction. It will be understood that the invention is applicable to both unidirectional and bidirectional mill operations.

For purposes of identification, each major component will be briefly discussed before continuing with the description of the overall system performance.

Reference characters 7 and 8 represent thickness or gage sensing devices of the displacement, X-ray, gamma ray, beta ray, etc., type. The gage sensing devices are labelled $G_L$ and $G_R$ for the reason that the direction of rolling will determine whether the left gage ($G_L$) or the right gage ($G_R$) output should be used to represent the input gage $G_1$ of the mill, while the opposite gage represents the actual output gage $G_{2-A}$.

Reference characters 16 and 17 represent servo type followers which are devices for sensing thickness of material information, and which accept the gage readings (usually in electrical form) from components 7 and 8 and convert them into mechanical shaft rotations represented at 18 and 19, respectively, which are proportional to thickness of material.

Shaft position digitizers 20 and 21 convert the shaft rotations 18 and 19 representing material thickness (as reflected in components 16 and 17) into a mathematical form suitable for computer input. The mathematical readout may be either of the decimal or binary class. However, in this case, the binary type of digitizer will be assumed as being used herein. In other words, the physical rotation of the servo followers 16 and 17 is converted into binary output signals in the digitizers 20 and 21. A suitable two-brush binary digitizer for use as circuits 20 and 21 is shown and described in detail, starting at page 471, of the book Digital Computer Components and Circuits, by R. K. Richards, published in 1957 by D. Van Nostand Co., Inc.

Decode logic unit 22 is an electronic repeater of the digitizers as well as a device which removes the ambiguity common to most two-brush commercial binary digitizers, such a unit also being shown in the aforesaid book entitled Digital Computer Components and Circuits by R. K. Richards. The unit also includes means for switching outputs of digitizers 20 and 21 in and out of the output channel connecting to the magnetic core buffer 23. Depending on the direction of rolling of the mill one of the digitizer readings (and only one) will be submitted to the magnetic storage chamber 24 via the magnetic core buffer 23. The direction of rolling will be selected by the mill operator at the "mill drive direction selector" unit 28, and a reflection of this selection will be relayed to the "decode logic" unit 22 over circuit 29. The decode logic unit will then make the proper switch contact closures to insure that the proper digitizer output ($G_1$) is supplied as an indication of mill input gage to the magnetic storage memory.

The direction of operation selected by the mill operator at the "mill drive direction selector" unit 28 also controls the selection of actual mill output gage $G_{2-A}$ at the same moment it controls the selection of the mill input gage $G_1$ in the decode logic unit 22. This selection of actual output gage $G_{2-A}$ is accomplished by relay unit 30 controlled by mill drive selector 28 over circuit 31. Relay 30 makes the proper circuit closures so that the proper digitizer output is supplied as an indication of actual output gage $G_{2-A}$ to gate 33 over circuit 32 to be compared with the desired output gage $G_{2-D}$. This gage selection will always be the opposite from that selected as the input to magnetic core buffer 23 by decode logic unit 22. In the example I have previously set forth the actual output gage measurement is supplied by the right gage ($G_R$) 8 and therefore information from digitizer unit 21 will be supplied to circuit 32 by relay unit 30.

The magnetic core buffer unit 23 is simply a buffer amplifier inserted for attaining better impedance match between the magnetic core load (of the magnetic core memory) and the transistor repeaters of the "decode logic" unit 22. Gain in stability is procured by this design since the buffer amplifier is usually designed to draw no grid current. Also, included in this unit is an electronic gate or latch which only allows the input strip gage measurement to be stored at certain intervals.

The magnetic core memory 24 is the storage point wherein the measured material entrance gage $G_1$ is contained until compared with desired value. Primarily, the memory is composed of ten storage chambers; nine of these chambers each have eleven magnetic cores to represent the progressive binary digits which must be combined to represent a certain measured gage. The tenth storage chamber is constructed of transistors rather than magnetic cores, since it is necessary to read-out the information from this chamber in serial fashion to the subtractor circuit represented at 25 and information returned to the tenth cell as indicated by the return path 26. A command circuit 27 extends from the subtractor 25 to the tenth cell of the magnetic memory for synchronizing the operation of this cell so that read-out occurs at the proper instant. Magnetic core memories do not lend themselves to serial fashion read-out conveniently. For a full and detailed description of a magnetic core memory unit of the type used herein, reference may be had to the aforesaid book Digital Computer Components and Circuits by R. K. Richards, where on page 221 a one-core-per-bit shifting circuit is described. A similar showing is in vol. 2, page 89 of the book Basics of Digital Computers by J. S. Murphy, published in 1958 by John F. Rider, Publisher, Inc., New York. As will be understood, there are ten bits which pass through the memory unit 24; and, accordingly, ten channels or circuits such as that shown in the references are employed in unit 24.

The memory is needed because it is necessary to measure the thickness of the material 4 in advance of the bite of the mill. It therefore becomes apparent that the thickness information must be stored, and in effect transported with the flow of the material to the bite of the mill, so that the gage thickness leading the memory corresponds to the thickness of the material at the bite of the mill. The memory 24 comprises, in the example herein explained, an eleven binary bit device having ten cells to progressively store and advance gage readings of the material 4 for every six inches of length thereof. The eleven binary bits are required to gain reasonable decimal capacity, which in this application is 2,047.

The strip length sensing means are the pulse generators 34 and 35 coupled to the idler rolls 36 and 37 respectively, of the mill. These pulse generators receive an R.F. signal from the demodulator units 38 and modulate it according to strip length passing each length-sensing element.

Demodulator units 38 are a source of R.F. energy (i.e. oscillators) for the pulse generators 34 and 35, as well as a means of reconverting (or demodulating) the modulated signal into pulses of D.C. energy representing strip length. A suitable demodulator or detector for use herein is shown on pages 553 to 558 of the book Radio Engineers Handbook by F. E. Terman, published in 1943 by McGraw-Hill Book Co., Inc., New York. Thus the combination of a pulse generator and its respective demodulator unit will produce either 500, 1000 or 2000 electrical pulses per revolution of the pulse generator, each revolution of the pulse generator in turn will represent a certain strip length of material entering the mill.

The system of this disclosure concerns a control means not only for unidirectional rolling mills, but also for reversible mills, therefore, the electrical pulses representing strip length from the entrance and exit sides of the mill must be directed to the proper pulse counting equipment at each reversal of the mill. In other words, the mill entering strip length pulses must always be recorded in the $L_1$ counter 39 and the mill exit length pulses in the $L_2$ counter 40. The counters 39 and 40 may, for example, comprise a series of cascaded flip-flop circuits which are preset or arranged to produce an output pulse in response to a predetermined number of input pulses. Such a counter is shown in U.S. Patent No. 2,858,431, issued to P. E. Le Fevre on October 28, 1958. To do this the switch 41 is supplied. Each time that the mill operator changes the mill drive direction selector 28 it will relay this information to the switch 41 (over circuit 42) and cause it to reverse lines "A" and "B" from the demodulators 38.

Multiplier 43 serves as a sensitivity selecting means. By use of it, selection can be made as to whether each revolution of the pulse generators 34 and 35 will result in 500, 1000 or 2000 electrical pulses being produced. That is, the multiplier 43 is a selective frequency converter, different types of which are shown and described, starting at page 569 of the aforesaid book, Radio Engineers Handbook by F. E. Terman.

As mentioned before, the equipment of this invention is not limited to unidirectional mill control. But each time that the controlled mill is reversed, certain control system components must be preselected to take care of this reversal. It is the prime duty of the mill drive direction selector, unit 28, to perform this function. This unit supplies a direction signal to cause contact closures in units 22, 30 and 41 by means of circuits 29, 31 and 42, respectively.

The desired output gage selector $G_{2-D}$, unit 44, consists of a manual selecting means, such as rotary switches or pushbuttons. $G_{2-D}$ can then be related in a number of forms, such as mechanical displacement, voltage, pressure, etc., however, for this explanation I will assume $G_{2-D}$ to be represented as a voltage. Mill operators can thus inject the desired output gage $G_{2-D}$ into the unit, wherefrom it emerges as a voltage of definite magnitude.

$G_{2-D}$ unit 44 actually supplies two output signals; one signal represents $G_{2-D}$, while the other signal reflects $2G_{2-D}$. Both signals will not be supplied simultaneously. The $G_{2-D}$ signal will be supplied from start-up until such time as the first increment of material, over which the rolling mill has had full automatic control, can reach the output gaging device, which in my example is gage 8. At that time the $G_{2-D}$ signal will be removed and a signal of double magnitude, namely $2G_{2-D}$, will be supplied. This is accomplished by signal, to the $2G_{2-D}$ output gate 45 and the $G_{2-D}$ output gate 46, from preset counter unit 47 over gate command circuit 48. It is at that time, and thereafter, that the actual measured output gage $G_{2-A}$ in input circuit 32 will be compared to the desired output gage $G_{2-D}$ in comparison gate 49.

Upon completion of the comparison, in gate 49, an error signal representing the result of the comparison must be added to the initial desired output gage $G_{2-D}$ to notify and present the $L_1$ preset counter unit 39. Mathematically this can be seen, since the error signal produced by the comparison is represented as follows:

$$\text{Error} = \Delta G_2 = G_{2-A} - G_{2-D}$$

while the present signal for the $L_1$ preset counter is represented as follows:

$$\begin{aligned} L_1 &= G_{2-D} - \Delta G_2 \\ &= G_{2-D} - (G_{2-A} - G_{2-D}) \\ &= 2G_{2-D} - G_{2-A} \end{aligned}$$

At start-up $L_1 = G_{2-D}$. Thus the need of a double magnitude signal, representing desired output gage, is evident. At initial start-up, only a signal of single magnitude $G_{2-D}$ is used, $G_{2-A}$ signal is blocked by gate 33, and no comparison is made until the results of automatic mill control can reach the output gage unit 8.

Unit 33 is a gate circuit which is momentarily opened by command signal from preset counter unit 47 over circuit 50, the counter 47 being similar to counters 39 and 40 already described. Thus, the $G_{2-A}$ voltage on circuit 32 cannot be admitted to comparison gate 49 until gate 33 is opened by command signal from preset counter unit 47.

Comparison gate 49 in which $G_{2-A}$ and $2G_{2-D}$ are compared during normal operation and through which $G_{2-D}$ on circuit 51 is passed during the initial start-up period is momentarily opened to perform the comparison operation or the passing operation on each command pulse on circuit 53 from shift preset counter unit 54. A suitable gate usable as circuit 49 is shown and described on pages 107-111 of the aforesaid book Digital Computer Components and Circuits by Richards. The counter unit 54, like units 39, 40 and 47 already described, comprises a series of flip-flop circuits connected in cascade and preset to produce an output pulse in response to a predetermined number of input pulses.

During normal operation the two $G_2$ signals entering comparison gate 49 are arranged to be of opposite polarity so that their difference is obtained. This difference in electrical form appears on circuit 74 when the comparison gate is open and is expressed as follows:

$$\text{Difference} = 2G_{2-D} - G_{2-A} = L_1$$

or $$G_{2-D} - \Delta G_2 = L_1$$

As I have shown earlier this is the preset signal for the $L_1$ counter. Thus:

$$L_1 = 2G_{2-D} - G_{2-A}$$

This electrical difference signal is received by a standard digitizer in the digitizer, accumulator and divider unit 75, to interpret the electrical signal in numerical form. This numerical figure is stored in an electronic accumulator since the system is controlled from an average of ten readings. Thus ten comparison readings will be summed in unit 75 under control of the ten pulse counter 64.

The ten pulse counter 64 is a repetitive type unit with a maximum range of ten counts. When the tenth pulse arrives at unit 64 from shift preset counter 54 via circuit 53, a pulse will be transmitted from counter 64 (via circuit 76) to command unit 75 to average the ten stored comparison readings and to preset the $L_1$ counter 39. Immediately following the preset operation a coincidence circuit is closed in $L_1$ counter 39 to supply electrical energy on circuit 77 to reset the accumulator of unit 75 for the storage of another series of ten comparison readings.

Since ten comparison readings are averaged in the accumulator of unit 75, division of the accumulated sum by ten to gain an average can be accomplished by merely shifting the decimal point of the sum. This shift is accomplished electrically by interconnecting the units digits of the accumulator to the tenths digits of the $L_1$ preset counter 39, interconnecting the tens digits of the accumulator to the units digits of the $L_1$ counter, etc., via circuit 78.

Reference character 55 designates a start unit operable by push-button 56 with which the mill operator initiates the solution of the comparison of $G_{2-A}$ and $2G_{2-D}$ by setting the various gate circuits, clears old information from the memory and starts introduction of new $G_1$ values into the memory unit.

The push-button closure (component 56) is taken as a notice by unit 55 to clear or reset counter 57 and to trigger oscillator 58 into a pulse conducting state. As will be understood, the operation of counter 57 is similar to the counters already described. At the same time, gate 59 is commanded (over circuit 60) to open and transmit pulses from oscillator 58 (via units 59, 61, 62 and 23) for the purpose of clearing (by stepping) the magnetic memory 24 of any old information that may be present, as well as supplying the memory with control signals for the storage of ten new readings of material gage. It may be noteworthy to mention that the strip increments over which this gage information is accumulated will not necessarily be of the same length as the gage measuring increments later determined by the shift preset counter unit 54. For start up, however, this condition is found to be satisfactory.

Further duties of unit 55 are to set preset counter 47 (via circuit 63) to start its count of 20 pulses, set counter 64 (via circuit 65) to start its count of 10 pulses, to close the $2G_{2-D}$ gate 45 (via circuit 66), and to open the $G_{2-D}$ gate 46 (via circuit 67). The latter gates (45 and 46) are thus set until twenty pulses later when their states are reversed by preset counter 47 by command signal over circuit 48.

Unit 58 consists of a standard electronic oscillator, controlled from unit 55, and transmitting pulses to units 57 and 58.

The counter 57 is also a standard unit of the preset counter nature. In this application, the counter is preset to ten counts, at which time, it closes the gate 59 to announce the completion of the input gage storage in the magnetic memory.

Gate unit 59 is of the electronic type also, and serves as a controlling and transmitting means of oscillator pulses used to step or command the magnetic memory storage circuits. As previously mentioned, this gate is opened (allowed to transmit pulses) by a signal from unit 55 via circuit 60 and the gate is closed by a signal from the ten-count counter 57.

Shift preset counter unit 54 is the means of commanding the magnetic memory 24 to make a gage storage, as well as, commanding the memory to shift all gage information forward one chamber. The shift preset counter is only used in this capacity after the initial start-up of the automatic control system. As mentioned before, at start-up the units 55, 58, 57 and 59 control the magnetic memory 24. After the initial start, those units are no longer used, and the shift preset counter unit 54 controls all storage in the magnetic memory.

Extreme variations in gage are not normally encountered and normally one reading of gage is stored in approximately six inches of strip. This length is adjustable in the preset means of unit 54. Since the storage command is related to certain increments of entering strip length, the shift preset counter unit 54 receives its input information from the mill entrance length sensing line $L_1$. This information is in the form of pulses, which are then counted in the shift preset counter. The existing relationship between the number of pulses generated by the pulse generators 34 and 35 as compared to the actual length of strip passing into the mill during the pulse generating time, as well as the length increment over which gage is to be measured, will determine the count at which the unit 54 should be preset. When the count reaches this value, a command (pulse) is given to store another reading of input gage $G_1$. This command is routed via circuit 53 and through the components 61, 62 and into component 23. This command pulse, and those following, is also transmitted to counters 47 and 64, similar to those counters already described (via circuit 53), to be counted, and the comparison gate 49 (via circuit 53) to momentarily open said gate.

The "or gate" unit 61 is a transistor circuit arranged in standard electronic fashion so that output energy will be supplied to the magnetic core drive amplifier unit 62 at any time that input energy appears on either circuit 68 or circuit 53. For a full and detailed description of an "OR gate" reference may be had to pages 37–39 of the aforesaid book Digital Computer Components and Circuits by Richards.

A magnetic core drive amplifier 62 primarily of the buffer amplifier type, is necessary in order to supply a low impedance pulse for driving the magnetic storage equipment. Unit 62 makes this low impedance pulse possible. In addition, this unit furnishes a lock circuit which serves to delay any read-in (storage) signals during a subtraction operation. This is necessary, otherwise a shift of gage information from one chamber to the following chamber may occur, and thus the information in the tenth and final chamber (being used in the subtraction operation) may be destroyed. Amplifier 62 may thus comprise a blocking oscillator which will produce an output pulse each time an input pulse is received from circuit 61; however this output pulse will be delayed with respect to the input pulse. For a full and detailed description of a blocking oscillator, reference may be had to page 514 of the aforesaid book Radio Engineers Handbook by Terman. The signal to lock is given by the subtractor unit 25 over the circuit 59.

Dual channel gate 70 is a vacuum tube unit so constructed that an electrical signal from circuit 71 will cause the tubes to conduct and pass the signals on the input channels. A signal on circuit 72 will cause the gate to close and stop passing of the input channel information. The signal controlling factors of circuit 72 will be discussed in the description of component 39.

$L_1$ counter unit 39 consists of a binary single preset counter. The value to which this counter is preset is determined by the average of ten comparison of $$2G_{2-D} - G_{2-A} = L_1$$

in unit 75, multiplied by a binary shift point constant (same power of two). The $L_1$ counter receives electrical pulses (representing strip length) from the dual gate unit 70. When the pulse count reaches the preset value, coincidence circuits respond to close dual gate unit 70 (to block all length measurement pulses from proceeding to the $L_1$ and $L_2$ counters), to notify $L_2$ counter unit 40 to stop counting and transfer this final count to the read-out unit 73 and to notify the read-out unit 73 to store the count reading of the $L_2$ counter unit 40. As soon as the $L_2$ count has been transferred and stored in the read-out unit 73, a signal will be transmitted from the read-out unit 73 to the $L_1$ and $L_2$ counter units 39 and 40 to cause the counters to reset to zero, also the same signal will be conveyed to the dual gate unit 70 via circuit 71 to cause the gate to open and again allow pulses to flow to the counters.

In the opening statements of this explanation of $L_1$ counter unit 39, brief mention was made that the value $(2G_{2-D} - G_{2-A})$ was multiplied by a binary shift point constant before being used as a preset for $L_1$ counter 39. This binary shift point mechanism (considered part of the $L_1$ and $L_2$ counter hardware arrangement of FIG. 2) consists of a stepping switch home-seeking device, in conjunction with a manual selector, the combination of which operates to multiply $(2G_{2-D} - G_{2-A})$ by some power of two (as selected with the manual selector). The manual selector in this case is of the three position type, and reflects multiplications by a factor of $2^0$, $2^1$, or $2^2$. Gain in accuracy is the main advantage of this device. This may be accomplished in two ways. First of all, it is common knowledge that the count of $L_1$ counter unit 39 should be of a magnitude consistent with the magnitude of $G_2$, the desired gauge. Thus, multiplying a small value of $(2G_{2-D} - G_{2-A})$ by $2^1$ or $2^4$ to bring the preset value of the $L_1$ counter within the above mentioned range would be advisable. Secondly, the increased preset value of $L_1$ counter will bring about a longer measuring time and possibly a better measurement of $L_2$.

Circuitry from a second contact bank on the stepping switches is used to automatically shift the binary set point in the reverse direction on the count attained in the $L_2$ counter unit 40. As an example, if the $(2G_{2-D} - G_{2-A})$ value is initially multiplied (with the binary shift point selector) by a value of $2^1$, then the count of $L_2$ counter unit 40 will also automatically be divided by $2^1$.

Unit 40 is an electronic binary counter unit similar to that of unit 39, except that it does not include any preset control. The output material length pulses are counted and upon command are submitted to the read-out unit 73 for storage; the acceptance of the information at the read-out unit then being followed by a reset signal to the $L_2$ counter unit 40, and the unit then again being ready to count pulses.

It is desirable at this time to explain how the division operation in our solution for the desirable input gage $\overline{G}_1$ has been performed. As previously written:

$$\overline{G}_1 = \frac{L_2 G_2}{L_1}$$

From FIG. 2 it can be seen that the value $$(2G_{2-D} - G_{2-A})$$

was transmitted to the $L_1$ counter unit 39 under normal operating conditions whereas the value $G_{2-D}$ is transmitted to the $L_1$ counter at start-up. In the $L_1$ counter unit 39, the $(2G_{2-D} - G_{2-A})$ or $G_{2-D}$ value was used to represent the preset value of $L_1$ counter, or in other words, $L_1$ was set equal to $(2G_{2-D} - G_{2-A})$ or $G_{2-D}$ units. Since under normal operating conditions:

$$L_1 = 2G_{2-D} - G_{2-A}$$

and under optimum conditions:

$$G_{2-A} = G_{2-D}$$

then $$L_1 = G_{2-D}$$

Also at start-up: $L_1 = G_{2-D}$, as seen from units 44, 46, 55 and 47.

Since $G_2 = G_{2-D}$ then $$\overline{G}_1 = \frac{L_2 G_{2-D}}{G_{2-D}} = L_2$$

Thus, the $L_2$ count is an absolute reflection of the calculated desirable input gage.

Read-out unit 73 consists of a series of transistor flip-flop circuits so arranged as to store the $L_2$ count in binary form. Each flip-flop circuit represents a certain binary digit. Gating circuitry is provided to allow transfer of information in and out of the equipment only at proper intervals. This gating circuitry is controlled by circuits 72 and 80 and comprises a series of pentode vacuum tubes, each of which has a grid connected to one of the aforesaid flip-flops and another grid connected to a switch, the arrangement being such that each pentode will conduct only upon coincidence of signals from the flip-flops with those from the switch.

The subtractor unit 25 is constructed of standard transistorized logic circuits which serially (one bit at a time) compare the measured value of input gage $G_1$ (as stored in the tenth chamber of unit 24) against the calculated desired value of input gage $\overline{G}_1$ (as stored in unit 73). A suitable subtractor for this purpose may be found, for example, in the aforesaid book Basics of Digital Computers, Murphy. Here again, transistor flip-flop circuitry is utilized to store the difference between corresponding bits. This information (magnitude of difference between $G_1$ and $\overline{G}_1$, as well as the sign of the difference) is then sent to the mill control unit 13 (via units 82 and 83), where it is set into flip-flop circuits controlling the alarm and screw operations.

In order to synchronize all operations, the subtractor unit 25 has a built-in distributor. The distributor provides the timed signal necessary to control the read-out of $G_1$, $\overline{G}_1$, also to control the subtractor and the dead zone and alarm set unit 82, and to reset unit 73 by means of circuit 80. The composite mechanism of this unit consists of a multivibrator transistor pulse gates and transistor flip-flop sequence circuit. As the gating circuits and flip-flop sequence circuit respond to the successive incoming pulses, signals are transmitted to the various components of the control system, viz., a signal is given for the first binary bit in the tenth chamber of unit 24 to be transferred into the subtractor by circuit 27. On the next flip-flop action, a signal is given to unit 73 via circuit 80 to have the corresponding binary bit transferred to the subtractor, via circuit 81, etc.

Dead zone and alarm set unit 82 consists of a manual selecting means (2 sets of 8 push-buttons each) for selecting the amount of deviation between $G_1$ and $\overline{G}_1$ that can occur before any mill control is initiated. The first set of push-buttons is circuited to the "and" gates and flip-flop circuits of the mill control unit 13, and determines when and whether a screw-up or screw-down operation should occur. The second set of push-buttons determines (over similar circuitry) the maximum deviation which can be tolerated. This means is used to energize alarm relays in unit 13 which in turn discontinue automatic control on the mill screws.

Although the relay controls can be energized once a significant error has been realized, the maximum time a relay may stay energized is controlled by the delay circuit of the time control unit 83. The delay circuit is simply an R-C circuit (with adjustable resistance) in which the charge rate of the timing capacitor determines the length of time that associated transistors pass current; this, in turn determining when a reset signal should be given to the relay control flip-flop circuits of unit 13.

As explained previously, the mill control unit 13 consists of several "and" gates, a series of transistor flip-flop circuits and four relays (LO, MLO, MHI, HI). The "and" gates upon receipt of simultaneous signals (at a time determined by the distributor) will set the flip-flop circuits if a difference equal to or greater than the preset values of unit 82 was obtained in the subtraction process. The state of the flip-flop circuits then determines which of the above mentioned relays is to be energized. Energization of the LO or HI relays signifies a difference greater than the permissible maximum has been obtained; an alarm is sounded and a mechanically latched relay is energized. The mechanical latch relays breaks all control circuits between the control system and the mill screws. The mill must then be manually controlled. Return to automatic control cannot be made until the mill operator removes the mechanical latch by pushing a reset button.

Energization of the MLO or MHI relays closes circuits to the solenoids on the mill screws in screw control unit 10. Depending on which relay (MLO or MHI) has been energized, the mill will respond with either screw-up or screw-down action to produce material on the output side of the mill with constant gage thickness. As stated previously, the length of the screw-down or screw-up operation is controlled from the time control unit 83.

*System Operation*

When the material is traversing the mill in one direction, input measurements are effected by one gage, while output measurements are effected by the opposite gage. For purposes of explanation the material strip 4 in FIG. 1 is travelling from left to right, thus input gage ($G_1$) is measured by gage head 7 and output gage ($G_{2-A}$) is measured by gage head 8.

The input and output gage heads $G_1$ and $G_{2-A}$ in positions 7 and 8, respectively, are electrically connected to the servo-followers 16 and 17 respectively, which are devices for sensing thickness of material at positions 7 and 8, respectively, and for converting this thickness information into mechanical shaft rotations at 18 and 19, respectively. These shaft rotations which are proportional to thickness, respectively operate shaft position digitizers 20 and 21 which produce binary outputs. These binary outputs are then fed electrically to the decode and logic unit 22 which serves to eliminate ambiguity, to decide which gage (7 or 8) information is to be used and then in turn feed this information into the magnetic core buffer 23 which then feeds this information into the memory assembly 24. The information chosen to be thus channeled into the memory is always the input gage information $G_1$. The magnetic core buffer 23 serves to put the input gage information into a form which the memory assembly 24 can accept. The memory is needed because it is necessary to measure the thickness of the material 4 in advance of the bite of the mill. It therefore becomes apparent that the thickness information must be stored, and in effect transported directly with the movement of the strip material 4 to the bite of the mill, so that the gage thickness leading the memory corresponds to the thickness of the material at the bite of the mill. The memory 24 comprises, in the example herein explained, an eleven binary bit device having ten cells to progressively store and advance gage readings of the material 4 for every six inches of length thereof. The eleven binary bits are required to gain reasonable decimal capacity, which in this application is 2,047.

The first nine cells of the memory are of magnetic storage arrangement where the tenth cell is transistorized. Information is read-out in serial fashion from this tenth cell to the subtractor circuit represented at 25 and information returned to the tenth cell as indicated by the return path 26. A command circuit 27 extends from the subtractor 25 to the tenth cell of the magnetic memory for synchronizing the operation of this cell so that read-out occurs at the proper instant.

Since the gage information is measured before the bite of the mill and then introduced into a memory assembly, it is necessary that the gage information be advanced through the memory in direct relationship with the passage of the strip 4 through the mill. This function is performed by employing the pulses generated in the strip length-sensing unit 34 which is a pulse generator which gives an electrical measurement of the length of material $L_1$ entering the mill in my example. These pulses are counted on the shift preset counter 54 which serves to advance the memory assembly 24 each time the pulses accumulated in this counter 54 reach the present value. For example, if the input gage $G_1$ is at position 7 and is sixty inches from the bite of the mill, and the memory assembly is ten cells deep it becomes necessary to divide the total pulses which would represent sixty inches into ten equal parts. Thus, if sixty inches of strip represented 3,000 pulses, the shift preset counter 54 would have been set at 300. It is in this manner that the input gage information is correlated with the strip product. As the shift preset counter 54 commands the memory assembly 24 to advance, it is necessary, for proper operation and synchronization, to interpose the magnetic core drive amplifier 62 with the output thereof connected to magnetic core buffer 23 to the input of the memory 24. Register shift hold circuit 69 from subtractor 25 to magnetic core drive amplifier 62 delays the pulse output therefrom in the event that a command to shift the memory assembly has occurred while a subtraction was taking place. Upon completion of the subtraction the hold circuit releases, permitting the magnetic core drive amplifier 62 to perform its function.

The circuit 69 therefore allows a binary number to be completely transferred from the last cell of the magnetic memory to the subtractor 25 before a new binary number is allowed to enter the last cell from the preceding cell. This overcomes the difficulty that a portion of a number being read-out in serial fashion from the last cell may be lost in part or in whole.

When a measured gage reading reaches the tenth cell of the magnetic memory 24, the tenth cell of the memory assembly has the input gage information of the increment of material about to enter the bite of the mill. At this time a calculation is made to determine what the input gage ($\overline{G}_1$) should be to produce the desired preset output gage ($G_{2-D}$) of the mill.

As heretofore explained, the principle involved in this invention is set forth by the following equation:

$$\overline{G}_1 = \frac{L_2}{L_1} G_2$$

$$G_1 - \overline{G}_1 = \text{error}$$

where:

$\overline{G}_1$ = Calculated input gage
$L_2$ = Output length
$L_1$ = Input length
$G_2$ = Preset desired output gage ($G_{2-D}$)
$G_1$ = Measured input gage.

The input $L_1$ and output $L_2$ strip length-sensing means are at positions 34 and 35 coupled to idler rolls 36 and 37. These pick-ups sample on a continuous basis the incremental length of the material entering the mill and leaving the mill by modulating an R.F. signal in direct relation to the incremental length. To utilize this information in this control system it is necessary to demodulate the signal in the demodulator unit 38. The respective outputs of the demodulator are a series of pulses; the number of pulses on each output line being exactly related to the number of revolutions of the pulse generators 34 and 35 and thus to the strip length. These outputs are fed into the switch unit 41 which establishes (according to mill direction information received from the mill drive direction selector 28 over circuit 42) which pulse generator output should be used as input length reflection $L_1$, as well as which of the two should be used as exit length reflection $L_2$. As mentioned in the component description, the outputs of the pulse generators 34 and 35 per increment of strip length can be multiplied with multiplier 43 to effect ideal control. The pulses generated by the mill entrance side pick-up $L_1$ are then fed through dual gate 70 to the $L_1$ binary counter 39, while the pulses generated by mill exit pick-up $L_2$ are fed through gate 70 to the $L_2$ binary counter 40.

The desired material output gage $G_{2-D}$ is manually introduced into the assembly 44 where it is reflected as a voltage. As shown in FIG. 2 unit 44 supplies two output signals; one signal represents $G_{2-D}$, while the other signal reflects $2G_{2-D}$. Both signals will not be supplied simultaneously. The $G_{2-D}$ signal is supplied only at start-up until such time as the first increment of material over which the rolling mill has had full automatic control, can reach the output gage head 8. At that time the $G_{2-D}$ signal is removed and the $2G_{2-D}$ signal is supplied by command of preset counter 47 which times the travel of the above mentioned increment of material. At that time and thereafter the actual measured output gage $G_{2-A}$ from gage head 8 is compared to the desired output gage signal $G_{2-D}$. Upon completion of the comparison an error signal representing the result of the comparison is automatically added to the initial desired output gage $G_{2-D}$ to notify and preset the $L_1$ preset counter 39. Mathematically this is shown:

Error signal from unit 49 (which is the $L_1$ preset signal)

$$= 2G_{2-D} - G_{2-A}$$
$$= G_{2-D} - (G_{2-A} - G_{2-D})$$
$$= G_{2-D} - \Delta G_2$$

If
$$G_{2-A} - G_{2-D} = 0$$
then
$$L_1 = G_{2-D} - 0 = G_{2-D}$$

(Note that the assumption at start-up is that $$G_{2-A} = G_{2-D}$$

and therefore $L_1$ preset equals $G_{2-D}$, since no reliable $G_{2-A}$ information is available at start-up.)

At initial start-up only, a signal of single magnitude $G_{2-D}$ is used, and during this time $G_{2-A}$ is locked out by gate 33, thus no comparison is made until the results of automatic mill control can reach the output gage head 8.

Gage head 8 measures the actual output gage $G_{2-A}$ of strip 4 and in association with its related components and by means of mill drive selector 28 and relay 30 this information is transmitted to gate 33. This $G_{2-A}$ information cannot be compared to the signal from unit 44 until gates 33 and 49 are opened.

At initial start-up of the automatic control system the mill operator pushes button 56 of start unit 55. This button initiates automatic control by the system by clearing the magnetic memory, inserting new data therein, etc. This button depression also resets counter units 47 and 64 over circuits 63 and 65, respectively, as well as to close gate 45 and open gate 46. Preset counter unit 47 is interconnected with shift preset counter unit 54 by means of circuit 53. Thus each time six inches of material passes into the mill, a pulse will be transmitted over circuit 53 which is connected to units 61, 47, 64 and 49. Since the $G_1$ and $G_2$ gages are assumed to be mounted five feet from each side of the mill, or ten feet from each other, ten feet of strip represented by twenty electrical pulses on circuit 53 must first pass from the mill before the error detection circuit will be commanded by counter 47 to initiate comparison and error detection. When the twentieth pulse reaches preset counter 47, it is passed on to circuits 48 and 50, since the preset count (20) of unit 47 has been reached. All ensuing pulses will also pass on to circuits 48 and 50 from circuit 53; however, the first pulse on circuit 48 will trigger and lock gate 45 to the open position (to allow $2G_{2-D}$ signal on circuit 52) and also trigger and lock gate 46 to the closed position (thus discontinuing $G_{2-D}$ signal on circuit 51). Preset counter unit 47 is only used at mill start-up for the purpose of providing the time lag (20 pulses) necessary for synchronizing the flow of material to the automatic comparison gate 49.

The first pulse on circuit 50 opens gate 33 momentarily to allow the $G_{2-A}$ electrical signal to be compared to $2G_{2-D}$ electrical signal via gate 49 (which will also be momentarily opened by a pulse from circuit 53). The two $G_2$ signals are arranged to be of opposite polarity and are interconnected so that their difference is obtained. This difference in electrical form appears on circuit 74 when gate 49 is open. Unit 75 uses a standard digitizer to interpret the electrical signal in numerical form. This numerical figure is stored in an electronic accumulator or summation circuit. The accumulator is necessitated by the decision to control the system from average $G_{2-A}$ readings. Ten comparison readings will be summed in digitizer, accumulator and divider unit 75. Since ten readings are used, division of the accumulated sum by ten to gain an average is accomplished by merely shifting the decimal point of the sum. The shift is accomplished electrically by interconnecting the units digits of the accumulator to the tens digits of the $L_1$ preset counter 39, by interconnecting the tens digits of the accumulator to the units digits of the $L_1$ preset counter 39, etc., via circuits 78.

Pulses from shift preset counter unit 54 also pass along circuit 53 to ten pulse counter unit 64. This unit 64 is a repetitive type counter with a maximum range of ten counts. When the tenth pulse reaches counter 64 via circuit 53 a pulse will be transmitted from the unit via circuit 76 to command the digitizer, accumulator and divider unit 75 to preset the $L_1$ counter 39 via circuits 78. As soon as this preset is complete, a coincidence circuit will be closed to supply electrical energy on circuit 77 to reset the accumulator of unit 75 for another series of ten readings or comparisons.

The average of ten comparison readings from unit 75 which provides the preset limit for the $L_1$ counter means that upon the accumulation in the $L_1$ counter 39 of this preset value, counter 39 will command the dual gate circuit 70 (through the lead 72) to close, which will thus block both the $L_1$ and the $L_2$ pulses to their respective counters. In addition a command to read-out and accept information is provided on circuit 72 to the $L_2$ counter 40 and read-out unit 73, respectively. Upon completion of the read-out into unit 73, both the $L_1$ and the $L_2$ counters are reset to zero by command from read-out unit 73, via circuit 71, which circuit also commands dual gate 70 to reopen, and the process is repeated.

Read-out 73 now contains in binary form the solution of the desired input gage which the mill should have in order to produce the desired output gage $G_{2-D}$. The output of readout 73 provides the calculated value $\overline{G}_1$ which is applied through lead 81 to the subtractor 25 upon command thereof through lead 80. The actual measured gage $G_1$ is supplied through lead 84 from the output of th tenth cell of memory 24 to the subtractor 25. The difference between the calculated value and the actual value of $G_1$ as expressed in the foregoing equation constitutes the difference signal which is fed through the unit 82 (which is designated as the dead-zone and alarm set) to the unit 83 (designated as time-control .01 to .1 and .1 to 1.0 second) to the mill control 13, heretofore explained.

In order to start this automatic control system, the control button 56 of the start unit 55 is closed. This action provides for the following operation:

(1) A pulse is transmitted to gate 57 from start unit 55 to start the count thereof and a pulse is transmitted from start unit 55 over circuit 60 to open gate 59.

(2) Oscillator 58 is functioned to deliver pulses to the single preset counter unit 57 and to the gate circuit 59. The gate 59 passes the pulses to the magnetic core drive amplifier 62, through the "or" gate 61 which serve to advance memory assembly 24, such as to clear the memory assembly of prior $G_1$ information and to introduce into each cell the new value of $G_1$. Upon completion of the above, preset counter 57 operates to close the gate 59 and hence disable the circuit.

(3) A pulse is transmitted over circuit 67 from start unit 55 to the $G_{2-D}$ gate 46 to open the gate and allow $G_{2-D}$ information from $G_{2-D}$ unit 44 to pass to comparison gate 49 over circuit 51.

(4) A pulse is transmitted from start unit 55 to the $2G_{2-D}$ gate 45 over circuit 66 to close the gate and prevent passage of $2G_{2-D}$ signals from unit 44 to comparison gate 49 over circuit 52.

(5) A pulse is transmitted over lead 63 from the start unit 55 to the twenty pulse preset counter unit 47 which sets the counter, thus initiating the counting by it of twenty pulses from shift preset counter unit 54 on circuit 53. Upon completion of this count the pulses on circuit 53 are thereafter passed through counter 47 to gates 45 and 46 by means of circuit 48, and to gate 33 by means of circuit 50.

(6) A pulse is transmitted from start unit 55 over circuit 65 to the ten pulse counter 64 to set the counter, thus initiating the repetitive counting by it of the ten pulses from shift preset counter 54 via circuit 53. Upon completion of this count of ten a single pulse is transmitted over circuit 76 to the digitizer, accumulator and divider unit 75 to command this unit to average the ten stored $G_{2-D}$ readings from $G_{2-D}$ unit 44 via gates 46 and 49. This average reading is immediately transmitted to $L_1$ preset counter 39 to preset said counter since its preset value is $L_1 = G_{2-D}$. This also results in the closing of dual gate 70, the stopping of $L_2$ counter 40 and the transfer of $L_2$ information therein to readout unit 73 since $\overline{G}_1 = L_2$, followed by the resetting of counters 39 and 40 and the opening of dual gate 70. This single pulse on circuit 76 also results in a command from $L_1$ counter 39 to unit 75 to begin storing ten more comparison readings from comparison gate 49.

Oscillator 58 is disabled as soon as counter 57 has reached its preset limit; thus signifying that the memory assembly 24 has been cleared of past information and refilled with new $G_1$ information (all ten cells).

The automatic control system of this invention as applied on a cold rolling steel mill will provide a very efficient, economical, practical, reliable and precise control.

The applicant realizes that there are many ways in which the principle of this invention may be carried out and the examples shown herein are to be considered in the illustrative sense and not in the limiting sense.

While I have described my invention in certain preferred embodiments, I realize that modifications may be made and I desire that it be understood that no limitations upon my invention are intended other than may be imposed by the scope of the appended claims.

What I claim as new and desire to secure by Letters Patent of the United States, is as follows:

1. In a system for controlling a rolling mill screwdown based on the principle of constant volume of material entering and leaving the mill, the combination of first means for producing an electrical signal which varies as a function of the length of strip material entering the rolling mill, second means for producing an electrical signal which varies as a function of the length of strip material leaving the rolling mill, third means for producing an electrical signal which varies as a function of the actual exit gage of strip material leaving the rolling mill, fourth means for producing an electrical signal proportional in magnitude to the desired output gage of strip material leaving the rolling mill, and a device responsive to the electrical signals produced by said first, second, third and fourth means for electrically computing the desired entrance gage of strip material entering the rolling mill.

2. A system for controlling a rolling mill screwdown as claimed in claim 1 and including fifth means for producing an electrical sginal which varies as a function of the actual input gage of strip material entering the rolling mill, apparatus responsive to the electrical signal produced by said fifth means and the output of said electrical computing device for producing an error signal, and means for applying said error signal to the rolling mill screwdown.

3. In a system for controlling a rolling mill screwdown in accordance with the constant volume formula $V_1 = V_2$ by comparison of measured material entrance gage and calculated desirable material entrance gage; the improvement of means including an electrical computer for deriving the calculated desirable material entrance gage by comparison of an electrical signal proportional to actual measured material output gage with an electrical signal proportional to selected desired output gage.

4. In a system for controlling a rolling mill screwdown in accordance with the constant volume formula $V_1 = V_2$ by comparison of measured material entrance gage and calculated desirable material entrance gage; the improvement of means including an electrical computer responsive to signals proportional to the length of material entering the mill and the length of material leaving the mill for deriving the calculated desirable material entrance gage by comparison of an electrical signal proportional to actual measured material output gage with an electrical signal proportional to selected desired output gage.

5. A system based on the constant volume principle for automatically controlling the operation of a rolling mill screwdown to produce a uniform desired output gage in strip material passing through the mill comprising, in combination, means for measuring the actual input gage of strip material entering the mill, means for measuring the actual output gage of strip material leaving the mill, means for inserting a desired output gage measurement of the strip material into said automatic screwdown control system, an entry gage memory unit, said entry gage memory unit containing stored material entry gage measurements from said means for measuring the actual input gage of the strip material entering the mill, means for advancing material entry gage measurements through said entry gage memory unit in synchronous correlation with the advancement of strip material through the mill, and means including a comparator for comparing an electrical signal having a magnitude proportional to the actual output gage measurements of the strip material leaving the mill with an electrical signal having a magnitude proportional to twice the inserted desired output gage measurement of the strip material in synchronous correlation with the advancement of the strip material through the mill to produce an electrically calculated desired material entry gage to effect automatic error compensation in the comparison of measured material entry gage and electrically calculated desired material entry gage by said system in controlling the operation of said screwdown.

6. In a system for controlling the operation of a rolling mill screwdown based on the constant volume principle as set forth in claim 5, means for accumulating and averaging a predetermined number of comparisons between said actual output gage measurements of the strip material leaving the mill and said inserted desired output gage measurement of the strip material to produce said calculated desired material entry gage based on an average of a predetermined number of said comparisons.

7. In a system for controlling the operation of a rolling mill screwdown based on the constant volume principle as set forth in claim 5, means for preventing the comparison between said actual output gage measurements of the strip material leaving the mill and said inserted desired output gage measurement of the strip material until such time when the results of the automatic mill control on said strip material advance to said means for measuring said actual output gage measurements of the strip material leaving the mill.

8. In an electrical gage control system for a rolling mill screwdown based on the principle of constant volume of material entering and leaving the mill and wherein the deviation from a desired output gage of the material is represented by an electrical signal proportional to $$G_1 - \frac{L_2}{L_1} G_{2D}$$

where $G_1$ is the actual gage of the material entering the mill, $L_2$ is the actual length of the material leaving the mill for a given volume entering the mill, $L_1$ is the actual length of the material entering the mill for said given volume, and $C_{2D}$ is the desired output gage of the material; the combination of means for producing an electrical signal having a magnitude proportional to $2G_{2D}$, means for producing an electrical signal $G_{2A}$ having a magnitude proportional to the actual output gage of the material leaving the mill, a circuit responsive to $G_{2A}$ and $2G_{2D}$ for obtaining a voltage having a magnitude proportional to the difference between $2G_{2D}$ and $G_{2A}$, means including counting devices for counting pulses proportional to $L_1$ and $L_2$ and respective to said voltage for producing an electrical signal proportional to $$\frac{L_2}{L_1} G_{2D}$$

means for producing an electrical signal proportional to $G_1$, a subtractor circuit responsive to the signals proportional to $$G_1 \text{ and } \frac{L_2}{L_1} G_{2D}$$

for producing an error signal proportional to $$G_1 - \frac{L_2}{L_1} G_{2D}$$

and means for applying said error signal to the screwdown to control the same.

9. In an electrical gage control system for a rolling mill screwdown based on the principle of constant volume of material entering and leaving the mill and wherein the deviation from a desired output gage of the material is represented by an electrical signal proportional to $$G_1 - \frac{L_2}{L_1} G_{2D}$$

where $G_1$ is the actual gage of the material entering the mill, $L_2$ is the actual length of the material leaving the mill for a given volume entering the mill, $L_1$ is the actual length of the material entering the mill for said given volume, and $G_{2D}$ is the desired output gage of the material; the combination of means for producing an electrical signal having a magnitude proportional to $2G_{2D}$, means for producing an electrical signal $G_{2A}$ having a magnitude proportional to the actual output gage of the material leaving the mill, a circuit responsive to $G_{2A}$ and $2G_{2D}$ for obtaining a voltage having a magnitude proportional to the difference between $2G_{2D}$ and $G_{2A}$, means for producing a number of electrical pulses proportional to the length of the material entering the mill over a given time interval, means for producing a number of electrical pulses proportional to the length of the material leaving the mill over said given time interval, a first counter for counting the pulses proportional to the length of the material entering the mill for said given volume, a second counter for counting the pulses proportional to the length of the material leaving the mill for said given volume, means responsive to said voltage having a magnitude proportional to the difference between $2G_{2D}$ and $G_{2A}$ for presetting said first counter, means for stopping the counting action of said second counter when the pulses counted by the first counter reach its preset value, means for producing an electrical signal proportional to the number of pulses counted by said second counter before its counting action is stopped, means for producing an electrical signal proportional to $G_1$, and means for subtracting said last two mentioned electrical signals to produce an error signal for controlling operation of said mill screwdown.

References Cited in the file of this patent

UNITED STATES PATENTS

| 2,275,509 | Dahlstrom | Mar. 10, 1942 |
| 2,664,557 | Sargrove | Dec. 29, 1953 |
| 2,708,254 | Macaulay et al. | May 10, 1955 |
| 2,834,927 | Halter | May 13, 1958 |
| 2,851,911 | Hessenberg | Sept. 16, 1958 |
| 2,883,895 | Vossberg | Apr. 28, 1959 |
| 2,897,638 | Maker | Aug. 4, 1959 |

FOREIGN PATENTS

| 571,793 | Canada | Mar. 3, 1959 |